DIRECT-CURRENT TRANSFER SYSTEM

Filed Feb. 25, 1947 2 Sheets-Sheet 1

Inventor
KARL R. WENDT &
HOWARD R. HEGBAR
H. S. Grover.
Attorney

DIRECT-CURRENT TRANSFER SYSTEM

8y

Inventor
KARL R. WENDT &
HOWARD R. HEGBAR
H. S. Grover.
Attorney

Patented Feb. 27, 1951 2,543,428

UNITED STATES PATENT OFFICE 2,543,428

DIRECT-CURRENT TRANSFER SYSTEM

Karl R. Wendt, Hightstown, N. J., and Howard R. Hegbar, Akron, Ohio, assignors to Radio Corporation of America, a corporation of Delaware Application February 25, 1947, Serial No. 730,852

18 Claims. (Cl. 250—36)

This invention relates to wave forming systems and more particularly to television tube horizontal or line deflection power systems.

The transfer from one direct current voltage to another direct current voltage normally requires the employment of equipment in the form of rotating machinery involving cumbersome or rotating elements which have maintenance problems. Reduction in direct current voltages may also be obtained through resistance drops involving low efficiency circuits.

According to this invention, D. C. transfer may be accomplished without resorting to rotating machinery and in such a manner that power loss accompanying the transfer is extremely small, as compared to power losses involved in the D. C. transfer equipment employing resistance elements.

Television horizontal magnetic deflection circuits normally employ vacuum tubes to generate the saw tooth wave currents required for deflection of the cathode ray beams used in the image scanning operation.

Because of the possible gain in efficiency in such horizontal magnetic deflection generators employed in television systems, attempts have often been made to use gas discharge tubes, such as those known in the art as "Thyratrons." However, the deionization time of "Thyratrons" imposes an important limitation which makes such tubes practically inoperative when used in conventional television horizontal magnetic deflection circuits.

According to this invention, a method and means has been provided whereby the grid controlled "Thyratron" may be made to conduct during the short or retrace interval when an arbitrary conduction wave shape can be used, and the energy then stored may be utilized during the entire long or trace interval to produce the desired wave shape. There is also provided current and voltage wave shapes during the retrace or short interval such that proper conditions are generated for the deionization of the "Thyratron" immediately following the conduction interval, thus taking advantage of the large short-time currents available from a "Thyratron" and allowing the deionization to take place during the longer trace interval when it will not interfere with the desired circuit operations. A portion of the energy stored during the conduction interval of the grid controlled "Thyratron" is used specifically for the purpose of deionization. Furthermore, it is provided that, as a part of the same means for producing the arbitrary wave shape during the retrace interval, the conventional television "damper" be used, and still further, that this may be a gas diode.

Linearization of the sawtooth wave for television system deflection or other wave shape correction may be accomplished by modifying the output current wave shape in the utilization element by combining with it an adjustable portion of the input charging current.

It will be seen that this invention may be employed as an efficient power or current transfer device. The input D. C. power may be returned as a separate D. C. output power with very little loss, as a result of the transfer. As applied to television magnetic deflection, the output power is supplied without the employment of a transformer at a high current and low voltage level, the current being stepped up approximately in the ratio of trace to retrace time intervals. Such power may, for example, be employed directly as a bias supply, a D. C. filament supply, or in other D. C. power utilization means.

A primary object of this invention is to provide improved D. C. transfer systems.

Another object of this invention is to provide a method and means for obtaining an efficient transfer of direct current or direct voltages.

Another object is to provide an improved television horizontal or line magnetic deflection generator.

Other and incidental objects of the invention will be apparent to those skilled in the art from a reading of the following specification and an inspection of the accompanying drawing in which Figure 1 and Figure 2 show schematic diagrams to be employed for the purpose of explanation of the operation of this invention;

Figure 1*a* and Figure 2*a* illustrate graphically the operation of the circuits shown in Figure 1 and Figure 2 respectively;

Throughout the drawing, like characters represent similar elements.

Figure 1:
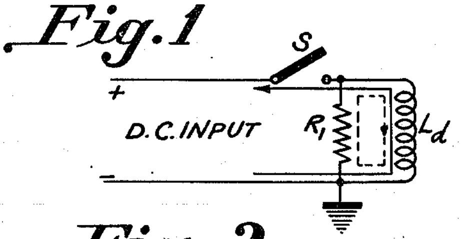

The operation of this invention may best be explained by referring first to Figure 1, wherein there is shown a simple circuit involving a D. C.

input voltage source and an inductance $L_d$, together with a switch S and a shunting resistance $R_1$.

If a D. C. potential is connected across an inductance, the current through the inductance builds up to a final value which is determined by the D. C. input voltage and the resistance of the inductance. The build-up of current is gradual because of the counter E. M. F. generated by the inductance. Immediately upon the starting of the flow of current through the inductance, magnetic lines of force move out, cutting the turns of wire in the inductance, building up a counter-E. M. F. which is opposed to the E. M. F. of the D. C. source. This opposition causes a delay in the time it takes the current through the inductance to build up to a maximum and uniform value. When the source of power is disconnected, the lines of force about the inductance collapse, again cutting the turns of the inductance and building up an E. M. F. which tends to prolong the current flow through the inductance.

When the switch S is closed, a voltage appears across both the inductance $L_d$ and the resistance $R_1$. A current attempts to flow through the inductance $L_d$, but, as explained above, this current builds up a back E. M. F. at the instant the switch S is closed, equalling the input voltage of the D. C. source. No current can flow through the inductance under this condition. This is illustrated at time T in Figure 1*a*.

Figure 1A:
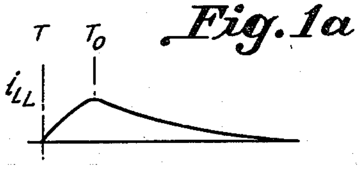

The current through the inductance $L_d$ will build up gradually to a maximum and will follow a curve, as illustrated in Figure 1*a*, between times T and $T_0$. The change in rate of increase of the current through inductance $L_d$ follows an exponential wave curve, as illustrated, and the reason therefor is that the back E. M. F. built up in the inductance $L_d$ gradually decreases.

If switch S is opened at $T_0$, the voltage across resistor $R_1$ will attempt to decrease to zero, but the inductance $L_d$ will again resist any change of current through it and attempt to maintain the original current flow. Since no supply voltage is impressed across the inductance $L_d$ at time $T_0$, a negative voltage is maintained across the resistor $R_1$ because of the action of the inductance $L_d$.

As the discharge current through the inductance $L_d$ begins to decrease by reason of the energy being dissipated in resistance $R_1$, the voltage across the resistor $R_1$ decreases proportionately. This is illustrated in Figure 1*a* following time $T_0$, wherein the current through the inductance $L_d$ reduces gradually to zero.

Figure 2:
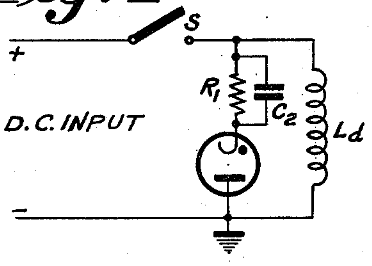

Turning now to Figure 2, a circuit somewhat similar to the circuit shown in Figure 1 is illustrated, however, a capacity $C_2$ is connected in shunt with resistance $R_1$, and a unidirectional current device, such as a gas diode $V_1$, is connected in series with $R_1$.

Figure 2A:

In Figure 2, the operation upon closing switch S is similar to the operation described above for the circuit shown in Figure 1. However, when switch S is opened at time $T_0$, as illustrated graphically in Figure 2*a*, the energy stored in inductance $L_d$ will cause a current to flow through resistance $R_1$. Due to the fact, however, that capacity $C_2$ is connected across resistance $R_1$, there will be a tendency for the voltage across $R_1$ to remain constant. This, in combination with the negligible voltage drop across tube $V_1$, will result in a substantially linear change in current through inductance $L_d$, as illustrated in the curve of Figure 2*a* following time $T_0$. In the above explanation, it has been assumed that the potential on condenser $C_2$ reached an equilibrium due to continued periodic operation of switch S.

Although it is not intended that the employment of this invention must necessarily be limited to the generation of deflection currents for magnetic deflection of cathode ray beams in television systems, its operation will be described by the utilization of inductance $L_d$ as a horizontal deflection yoke of a cathode ray tube. The yoke may, for example, take the form shown and described in the U. S. patent to W. A. Tolson, No. 2,167,379, dated July 25, 1939.

Figures 3, 4, 5:
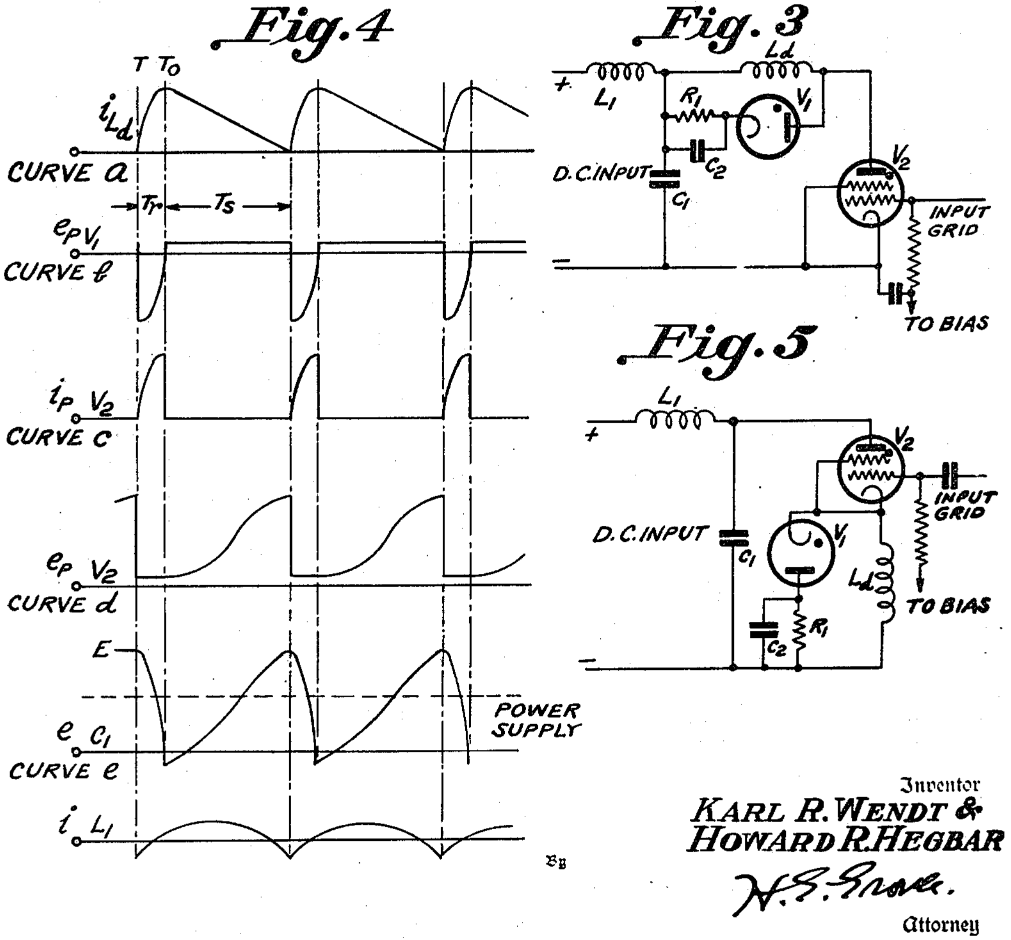
Figure 3 shows by circuit diagram one preferred form of this invention.
Figure 4 shows graphically the operation of one form of this invention.
Figures 5, 6 and 7 show schematically other preferred forms of this invention.

Turning now to Figure 3, tube $V_2$ is substituted for switch S of Figure 2. Tube $V_2$ may take the form of a grid controlled "Thyratron" whose control electrode is triggered with, for example, horizontal synchronizing pulses.

Inductance $L_1$ and capacity $C_1$ are employed to more efficiently utilize the D. C. input power by providing a stepped up potential. From the explanation that follows, it will be seen that by properly choosing the values of inductance $L_1$ and capacity $C_1$, a maximum voltage for utilization will result.

A reference to the circuit diagrams and to the curves shown in Figure 4 will aid in the explanation of the operation of this invention.

Curve *a* of Figure 4 shows the current flowing through inductance $L_d$. Curve *b* illustrates graphically the voltage across diode $V_1$. Curve *c* illustrates the current through tube $V_2$. Curve *d* represents graphically the plate voltage of tube $V_2$. Curve *e* represents the voltage across condenser $C_1$.

At time T, when tube $V_2$ is fired, capacity $C_1$ has become charged to a positive potential E. This same voltage, less the drop across inductance $L_d$, appears across tube $V_2$. The voltage drop across inductance $L_d$ during the sweep time $T_s$ is small compared to voltage E, thus practically the full voltage E is supplied to the plate of tube $V_2$. Immediately upon being fired by the synchronizing pulse applied to the control electrode of tube $V_2$, the plate voltage of $V_2$ drops to a low value applying a large voltage across inductance $L_d$. This causes a current to start flowing in the circuit involving capacity $C_1$, inductance $L_d$ and tube $V_2$ because of the stored charge in capacity $C_1$. This current flow behaves sinusoidally, except that after one-quarter of a cycle, the frequency of which is determined by capacity $C_1$ and inductance $L_d$, the voltage across capacity $C_1$ reverses, driving the cathode of diode $V_1$ negative with respect to its associated anode. Diode $V_1$ then fires automatically, and the voltage across inductance $L_d$ is substantially constant during the sweep interval $T_s$. A constant voltage across an inductance causes the current to vary linearly according to the equation $$E=-L\frac{di}{dt}$$

The energy stored in inductance $L_d$ as a current then "runs down" through diode $V_1$ and resistance $R_1$ and capacity $C_2$. Capacity $C_2$ is large and serves to hold the voltage constant during a cycle, and resistance $R_1$ dissipates the power thus obtained from the inductance $L_d$. $R_1$ is adjusted until the discharge rate becomes such that the current reaches zero at or immediately following the end of the sweep interval $T_s$. A linearly varying or sawtooth of current thus exists through inductance $L_d$.

During the retrace time $T_r$ the current through tube $V_2$ builds up from zero to a maximum in a quarter sine wave, commencing at what would normally be the axis and ending on the peak. When $V_1$ fires, the current through $L_d$ then transfers to $V_1$, and the current through tube $V_2$ drops rapidly to about zero. A small current may continue to flow which will further decrease the charge on capacity $C_1$ until deionization of tube $V_2$ is complete and the current through tube $V_2$ drops to zero.

Current through inductance $L_1$ now commences to charge capacity $C_1$ sinusoidally. Inductance $L_1$ and capacity $C_1$ are so chosen that approximately one-half cycle of a sine wave is completed during the time $T_s$. This wave shape must have as its axis the value of the D. C. input voltage. The voltage across capacity $C_1$ therefore swings as far above the axis as it was below at the beginning of time $T_s$, and capacity $C_1$ thus acquires a voltage approximately twice that of the power supply, as illustrated in Figure 4 by curve *e*. The voltage at the plate of tube $V_2$ thus appears as illustrated in curve *d* of Figure 4. The current through inductance $L_1$ likewise varies sinusoidally during the time $T_s$. The current through inductance $L_1$ is out of phase with the voltage across $L_1$, however, starting from approximately zero, it rises to a maximum value and falls again to zero or actually reverses in direction. Inductance $L_1$, capacity $C_1$ may be so chosen that more than one-half cycle transpires during this interval $T_s$, and the current through inductance $L_1$ is appreciably negative at the end of the time $T_s$. During the retrace time $T_r$, this negative current changes slope rapidly and reduces in value, again approaching zero. At the end of time $T_r$, when it is desired to deionize tube $V_2$, this current is zero or still slightly negative. Thus capacity $C_1$ does not immediately swing positive, but may actually swing slightly negative, as illustrated in curve *e*, thus aiding the deionization of tube $V_2$. At this time also the grid of tube $V_2$ is driven considerably negative and maintained there to enhance the deionization of tube $V_2$.

By employing a saturated choke at position $L_1$, the input charging current may be made quite nonlinear, such that during the early portion of the charging interval the current will remain low, thus allowing further time for the deionization of the "Thyratron."

Figure 5 shows another preferred form of this invention. It will be seen that the circuit illustrated in Figure 5 transposes tube $V_2$ and the inductance $L_d$ with its associated circuit elements. The operation of the circuits shown in Figure 5 is essentially the same as the operation of the circuit shown in Figure 3.

Figure 6:
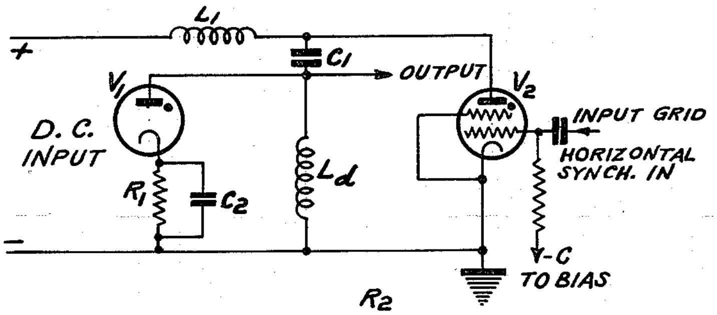

Figure 6 is still another preferred form of this invention wherein diode $V_1$ appears in the charging circuit through capacity $C_1$.

Figure 7:
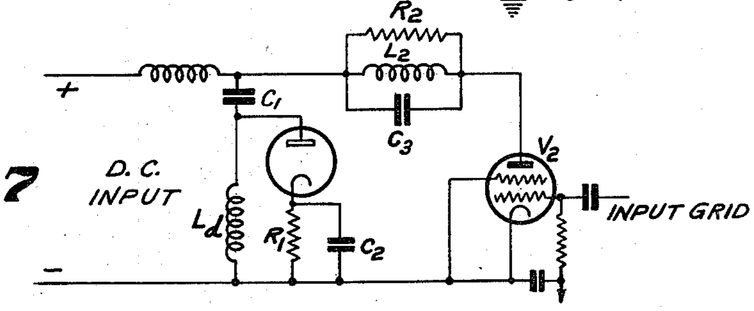

The circuit arrangement shown in Figure 7 further enhances deionization. Inductance $L_2$, capacity $C_3$ and resistance $R_2$ are added to provide an arrangement which adds a sinusodially varying voltage to the voltage appearing across capacity $C_1$, thus giving a voltage across the tube $V_2$ which takes the form of the curve shown in Figure 8. It will be seen that in this arrangement, the anode of tube $V_2$ is driven definitely negative with respect to the voltage of its cathode, which further enhances deionization of tube $V_2$.

Figure 8:
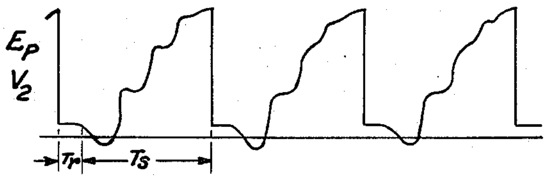
Figure 8 shows graphically the operation of the circuits shown in Figures 7 and 9.
Figures 9, 10:
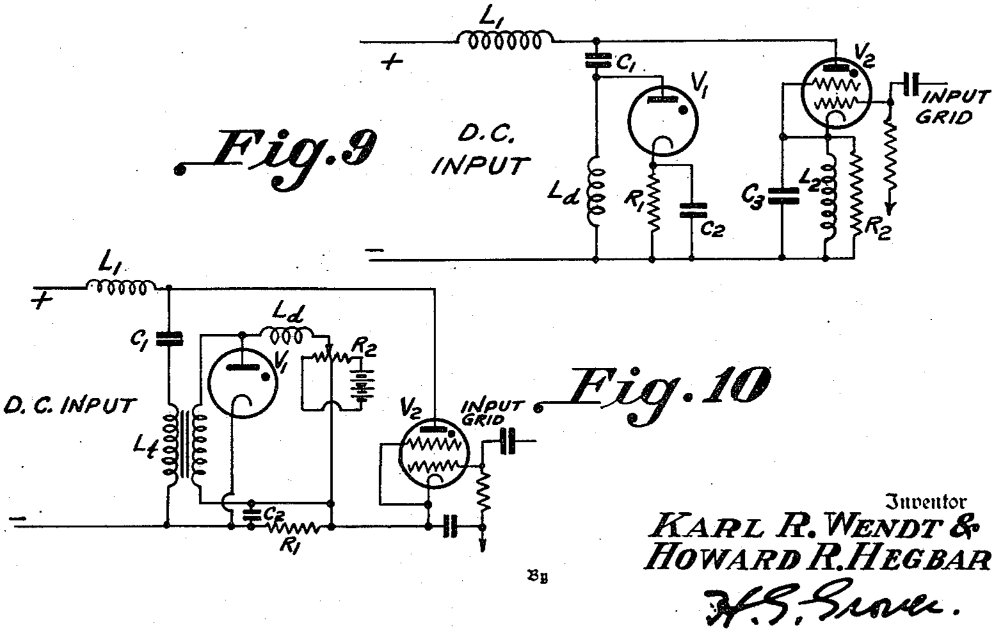
Figures 9 and 10 show additional preferred forms of this invention.

Figure 9 illustrates by circuit diagram another preferred form of this invention involving inductance $L_2$, capacity $C_3$ and resistance $R_2$ for enhancing the deionization of tube $V_2$, as explained in more detail above in the description of the circuit diagram shown in Figure 7 and the graph shown in Figure 8.

Figure 10 illustrates one preferred form of this invention wherein the direct current output power may be made to appear at a lower current level by including a transformer $L_t$. The voltage across condenser $C_2$ may then be applied to tube $V_2$ in series with the power supply, the output power thereby being reused in the circuit and consequently reducing the input power required. Resistance $R_1$ of Figure 10 merely serves to adjust the output current of diode $V_1$ to equal the input current of tube $V_2$. This, in effect, acts as a vernier adjustment on the current step-down ratio of transformer $L_t$. The leakage inductance of this transformer $L_t$ appears in the circuit similarly to the inductance $L_2$ of the circuits illustrated in the previous Figures 7 and 9, and therefore serves the same purpose. $R_2$ of Figure 10 serves as a centering control of the deflection system.

Having thus described the invention, what is claimed is:

1. A direct current transfer device comprising in combination an input circuit adapted to receive a direct current potential, an oscillatory circuit coupled to said input circuit, said oscillatory circuit having a condenser and an inductance connected together, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected between said input circuit and said oscillatory circuit, and means for closing said switching device periodically for relatively small time intervals.

2. A direct current transfer device comprising in combination an input circuit adapted to receive a direct current potential, a wave forming circuit coupled to said input circuit, said wave forming circuit having a condenser and an inductance connected together, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected between said input circuit and said oscillatory circuit, said switching device comprising a gaseous discharge tube, and means for firing said gaseous discharge tube periodically.

3. A direct current transfer device comprising in combination an input circuit adapted to receive a direct current potential, an oscillatory circuit connected to said input circuit, said oscillatory circuit having a condenser and an inductance connected serially with each other, a unidirectional current flow circuit connected across said inductance, the conductive polarity of which is opposed to the polarity of the said input circuit, said unidirectional current flow circuit including a serially connected gaseous rectifying element and a resistance element, said resistance element shunted with a capacitive element, a switching circuit connected between said input circuit and said oscillatory circuit, said switching circuit comprising a gaseous discharge tube, and means for firing said gaseous discharge tube periodically.

4. A direct current transfer device comprising in combination an input circuit adapted to receive a direct current potential, an oscillatory circuit connected to said input circuit, said oscillatory circuit having a condenser and an inductance connected serially with each other, a unidirectional current flow circuit connected across said inductance, the conductive polarity of which is opposed to the polarity of the direct current potential applied to said input circuit, said unidirectional current flow circuit including a serially connected gas diode and a resistance element, said resistance element shunted with a capacitive element, a switching device connected to said input circuit and to said oscillatory circuit, said switching device comprising a gaseous discharge tube, and means for firing said gaseous discharge tube periodically.

5. A sawtooth wave generator comprising in combination an input circuit adapted to receive a direct current potential, an oscillatory circuit connected to said input circuit, said oscillatory circuit having a condenser and an inductance each connected serially with the other and each connected serially in the input circuit, a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, a switching device connected to said input circuit and to said oscillatory circuit, said switching device comprising a gaseous discharge tube, and means for firing said gaseous discharge tube periodically and at the beginning of the snap back time interval of the sawtooth wave.

6. A sawtooth wave generator comprising in combination an input circuit adapted to receive a direct current potential, an oscillatory circuit connected to said input circuit, said oscillatory circuit having a condenser and an inductance each connected serially with the other and each connected serially in the input circuit, a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, a switching device connected to said input circuit and to said oscillatory circuit, said switching device comprising a gaseous discharge tube, and means for making said gaseous discharge tube conductive only during a portion of the snap back time of the sawtooth wave.

7. A sawtooth wave generator comprising in combination an input circuit adapted to receive a direct current potential, an oscillatory circuit connected to said input circuit, said oscillatory circuit having a condenser and an inductance each connected serially with the other and both connected in said input circuit, a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, and a switching device connected to said input circuit and to said oscillatory circuit, said switching device comprising a grid controlled "Thyratron," said grid of said "Thyratron" adapted to receive synchronizing pulses.

8. A sawtooth wave generator comprising in combination an input circuit adapted to receive a direct current potential, an oscillatory circuit connected to said input circuit, said oscillatory circuit having a condenser and an inductance each connected serially with the other and both connected in said input circuit, a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, a switching device connected to said input circuit and to said oscillatory circuit, and means for closing said switch only during the snap back time interval of the sawtooth wave.

9. A sawtooth wave generator comprising in combination an input circuit adapted to receive a direct current potential, an oscillatory circuit connected to said input circuit, said oscillatory circuit having a condenser and an inductance, said input circuit, condenser and inductance all connected serially a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, a switching device connected to said input circuit and to said oscillatory circuit comprising a grid controlled "Thyratron," means for firing said grid controlled "Thyratron" at the beginning of the snap back time interval of the sawtooth wave, and means for starting the deionization of said "Thyratron" during the snap back time interval of the sawtooth wave.

10. A sawtooth wave generator comprising in combination an input circuit adapted to receive a direct current potential, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said input circuit, said unidirectional current flow circuit including a serially connected rectifying element and a resistance element, said resistance element shunted with a capacitive element, a switching device connected to said input circuit and to said oscillatory circuit comprising a grid controlled "Thyratron," means for firing said grid controlled "Thyratron" at the beginning of the snap back time interval of the sawtooth wave, and means for starting the deionization of said "Thyratron" during the snap back time interval of the sawtooth wave comprising an auxiliary oscillatory circuit, said auxiliary oscillatory circuit connected to said "Thyratron."

11. A sawtooth wave generator comprising in combination an input circuit adapted to receive a direct current potential, as oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected to said input circuit and to said oscillatory circuit comprising a grid controlled "Thyratron," means for firing said grid controlled "Thyratron" at the beginning of the snap back time interval of the sawtooth wave, and means for starting the deionization of said "Thyratron" during the snap back time interval of the sawtooth wave comprising an auxiliary oscillatory circuit, said auxiliary oscillatory circuit connected to said "Thyratron" and tuned to a frequency greater than the frequency of the sawtooth wave.

12. A sawtooth wave generator comprising in combination an input circuit adapted to receive a direct current potential, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the potential applied to said inductance from said input circuit, said unidirectional current flow circuit including a serially connected rectifying element and a resistance element, said resistance element shunted with a capacitive element, a switching device connected to said input circuit and to said oscillatory circuit comprising a grid controlled "Thyratron," means for firing said grid controlled "Thyratron" at the beginning of the snap back time interval of the sawtooth wave, and means for deionizing said "Thyratron" immediately following the firing of the "Thyratron."

13. A sawtooth wave generator comprising in combination an input circuit adapted to receive a direct current potential, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected to said input circuit and to said oscillatory circuit to actuate said oscillatory circuit comprising a grid controlled "Thyratron," means for firing said grid controlled "Thyratron" at the beginning of the snap back time interval of the sawtooth wave, and means for deionizing said "Thyratron" immediately following the firing of the "Thyratron" and during a portion of the long trace interval of the sawtooth wave.

14. A sawtooth wave generator comprising in combination an input circuit adapted to receive a direct current potential, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said inductance from said input circuit, said unidirectional current flow circuit including a serially connected gas diode, a resistance element, said resistance element shunted with a capacitive element, a switching device connected to said input circuit and to said oscillatory circuit comprising a grid controlled "Thyratron," means for firing said grid controlled "Thyratron" at the beginning of the snap back time interval of the sawtooth wave, means for starting the deionization of said "Thyratron" during the snap back time interval of the sawtooth wave comprising an auxiliary oscillatory circuit, an auxiliary control electrode for said "Thyratron," and a connection between said auxiliary oscillatory circuit and said auxiliary control electrode.

15. In a television system, a horizontal magnetic deflection signal generator comprising in combination an input circuit adapted to receive a direct current potential, an oscillatory circuit connected to said input circuit, said oscillatory circuit having a condenser and an inductance, said input circuit, condenser and inductance all connected serially, said inductance comprising the horizontal magnetic deflection yoke, a unidirectional current flow circuit connected across said inductance, the conductive polarity of which is opposed to the polarity of the direct current potential applied to said inductance from said input circuit, said unidirectional current flow circuit including a serially connected gas diode and a resistance element, said resistance element shunted with a capacitive element, and a switching device connected to said input circuit and to said oscillatory circuit comprising a grid controlled "Thyratron," said grid of said "Thyratron" adapted to receive synchronizing pulses.

16. A direct current transfer device comprising in combination an input circuit adapted to receive a direct current potential, said input circuit including a serially connected choke, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected to said input circuit and to said oscillatory circuit, said switching device comprising a gaseous discharge tube, and means for firing said gaseous discharge tube periodically.

17. A direct current transfer device comprising in combination an input circuit adapted to receive a direct current potential, said input circuit including a serially connected saturated choke, an oscillatory circuit connected to said input circuit, said oscillatory circuit having a condenser and an inductance, said input circuit, condenser and inductance all connected serially, a unidirectional current flow circuit connected across said inductance, the conductive polarity of which is opposed to the polarity of the direct current potential applied to said inductance from said input circuit, said unidirectional current flow circuit including a serially connected rectifying element and a resistance element, said resistance element shunted with a capacitive element, a switching device connected to said input circuit and to said oscillatory circuit, said switch device comprising a gaseous discharge tube, and means for firing said gaseous discharge tube periodically.

18. A direct current transfer device comprising in combination an input circuit adapted to receive a direct current potential, a wave forming circuit coupled through a transformer to said input circuit, said wave forming circuit having a serially connected condenser and an inductance, a unidirectional current flow circuit connected across said inductance, the conductive polarity of which is opposed to the polarity of the direct current potential applied to said inductance from said input circuit, said unidirectional current flow circuit including a serially connected rectifying element and a resistive element, said resistance element shunted with a capacitive element, a switching device connected to said input circuit and to said oscillatory circuit, said switching device comprising a gaseous discharge tube, and means for firing said gaseous discharge tube periodically.

KARL R. WENDT.
HOWARD R. HEGBAR.

REFERENCES CITED

The following references are of record in the file of this patent:

UNITED STATES PATENTS

| Number | Name | Date |
|---|---|---|
| 2,098,052 | Lord | Nov. 2, 1937 |
| 2,181,309 | Andrieu | Nov. 28, 1939 |
| 2,227,480 | Andrieu | Jan. 7, 1941 |